(12) United States Patent
Al-Gahtani et al.

(10) Patent No.: US 8,102,998 B2
(45) Date of Patent: *Jan. 24, 2012

(54) METHOD FOR ELLIPTIC CURVE SCALAR MULTIPLICATION USING PARAMETERIZED PROJECTIVE COORDINATES

(75) Inventors: Theeb A. Al-Gahtani, Dhahran (SA); Mohammad K. Ibrahim, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 12/854,126

(22) Filed: Aug. 10, 2010

(65) Prior Publication Data

US 2010/0322422 A1 Dec. 23, 2010

Related U.S. Application Data

(63) Continuation-in-part of application No. 11/797,369, filed on May 2, 2007, now abandoned.

(51) Int. Cl.
*H04K 1/00* (2006.01)
(52) U.S. Cl. .................................. 380/30; 380/28
(58) Field of Classification Search ............... 380/28, 380/30, 255, 282
See application file for complete search history.

(56) References Cited

U.S. PATENT DOCUMENTS

| | | | |
|---|---|---|---|
| 5,271,061 A | 12/1993 | Crandall | |
| 5,497,423 A | 3/1996 | Miyaji | |
| 5,737,424 A | 4/1998 | Elteto | |
| 6,212,277 B1 | 4/2001 | Miyaji | |
| 6,212,279 B1 | 4/2001 | Reiter | |
| 6,252,959 B1 | 6/2001 | Paar et al. | |
| 6,307,935 B1 | 10/2001 | Crandall | |
| 6,560,336 B1 | 5/2003 | Arita | |
| 6,782,100 B1 | 8/2004 | Vanstone | |
| 6,876,745 B1 | 4/2005 | Kurumatani | |
| 6,956,946 B1 | 10/2005 | Hess | |
| 7,308,096 B2 * | 12/2007 | Okeya et al. | 380/28 |
| 7,505,587 B2 * | 3/2009 | Izu et al. | 380/30 |
| 2001/0048741 A1 | 12/2001 | Okeya | |
| 2003/0059042 A1 * | 3/2003 | Okeya et al. | 380/30 |
| 2003/0123656 A1 * | 7/2003 | Izu et al. | 380/30 |
| 2003/0156714 A1 * | 8/2003 | Okeya | 380/30 |

(Continued)

FOREIGN PATENT DOCUMENTS

EP 1296224 A1 3/2003
JP 2003084666 3/2003

*Primary Examiner* — Samson Lemma
(74) *Attorney, Agent, or Firm* — Richard C. Litman

(57) ABSTRACT

The method for elliptic curve scalar multiplication in an elliptic curve cryptosystem implemented over an insecure communications channel includes the steps of: (a) selecting positive integers $L_x$ and $L_y$, where $L_x$ and $L_y$ are not both equal to 1, and where $L_y \neq 3$ if $L_x=2$; (b) representing coordinates of a point P=(x,y) on an elliptic curve of the form $F(x,y)=y^2-x^3-ax-b=0$ defined over a finite field as projective coordinates according to transforms $$x = \frac{X}{Z^{L_x}} \text{ and } y = \frac{Y}{Z^{L_y}},$$

respectively; and (c) adding together K copies, K being a scalar, of the point $P(X,Y,Z^{L_x},Z^{L_y})$ to obtain the scalar multiplication product KP. The scalar multiplication product is then converted from parameterized projective coordinates $P(X,Y,Z^{L_x},Z^{L_y})$ to affine coordinates P(x,y). The method is optimized by restricting $L_y$ so that $L_y-L_x \geq 0$ or, alternatively, so that $L_y=L_x$. The method may be carried out on a cryptographic device, which may be a computer, a (cellular) telephone, a smart card, an ASIC, or the like.

11 Claims, 1 Drawing Sheet

U.S. PATENT DOCUMENTS

| | | |
|---|---|---|
| 2004/0010689 A1 | 1/2004 | Vanstone |
| 2004/0247114 A1* | 12/2004 | Joye ............................. 380/28 |
| 2005/0152541 A1* | 7/2005 | Takenaka et al. ............. 380/28 |
| 2005/0195973 A1 | 9/2005 | Ibrahim |
| 2006/0093137 A1* | 5/2006 | Izu et al. ....................... 380/30 |
| 2009/0046851 A1* | 2/2009 | Elmegaard-Fessel ......... 380/28 |
| 2009/0207997 A1* | 8/2009 | Izu et al. ....................... 380/28 |
| 2009/0214025 A1* | 8/2009 | Golic ............................ 380/28 |
| 2009/0214027 A1* | 8/2009 | Landrock et al. ............. 380/30 |
| 2010/0177886 A1* | 7/2010 | Futa et al. ..................... 380/28 |

* cited by examiner

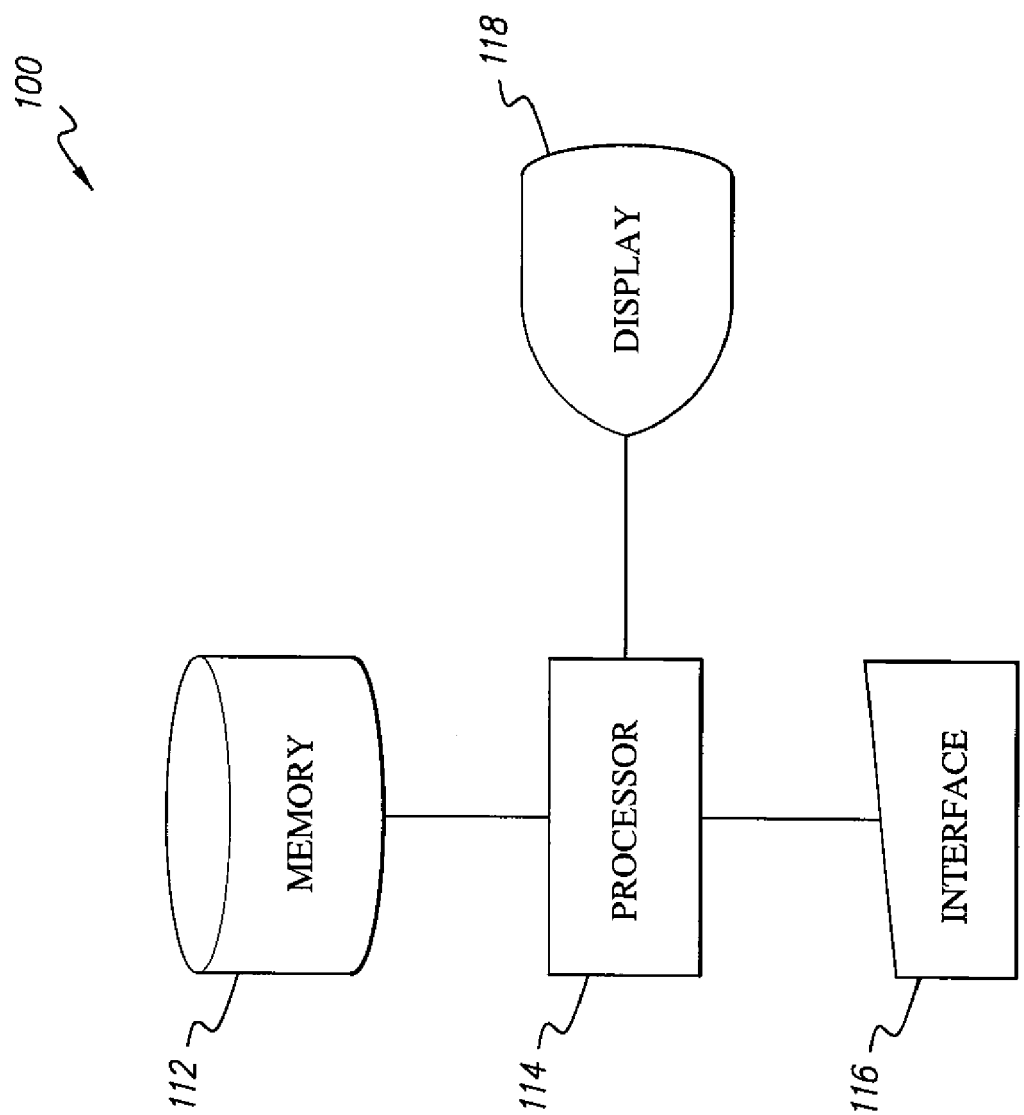

METHOD FOR ELLIPTIC CURVE SCALAR MULTIPLICATION USING PARAMETERIZED PROJECTIVE COORDINATES

CROSS-REFERENCE TO RELATED APPLICATION

This application is a continuation-in-part application of U.S. patent application Ser. No. 11/797,369, filed on May 2, 2007.

BACKGROUND OF THE INVENTION

1. Field of the Invention

The present invention relates to cryptography and methods for encrypting messages for transmission over an insecure communications channel, and particularly to a method for elliptic curve scalar multiplication in a cryptographic system that uses parameterized projective coordinates.

2. Description of the Related Art

Cryptography provides methods of providing privacy and authenticity for remote communications and data storage. Privacy is achieved by encryption of data, usually using the techniques of symmetric cryptography (so called because the same mathematical key is used to encrypt and decrypt the data). Authenticity is achieved by the functions of user identification, data integrity, and message non-repudiation. These are best achieved via asymmetric (or public-key) cryptography.

In particular, public-key cryptography enables encrypted communication between users that have not previously established a shared secret key between them. This is most often done using a combination of symmetric and asymmetric cryptography: public-key techniques are used to establish user identity and a common symmetric key, and a symmetric encryption algorithm is used for the encryption and decryption of the actual messages. The former operation is called key agreement. Prior establishment is necessary in symmetric cryptography, which uses algorithms for which the same key is used to encrypt and decrypt a message.

Public-key cryptography, in contrast, is based on key pairs. A key pair consists of a private key and a public key. As the names imply, the private key is kept private by its owner, while the public key is made public (and typically associated to its owner in an authenticated manner). In asymmetric encryption, the encryption step is performed using the public key, and decryption using the private key. Thus, the encrypted message can be sent along an insecure channel with the assurance that only the intended recipient can decrypt it.

The key agreement can be interactive (e.g., for encrypting a telephone conversation) or non-interactive (e.g., for electronic mail).

User identification is most easily achieved using what are called identification protocols. A related technique, that of digital signatures, provides data integrity and message non-repudiation in addition to user identification. The public key is used for encryption or signature verification of a given message, and the private key is used for decryption or signature generation of the given message.

The use of cryptographic key pairs was disclosed in U.S. Pat. No. 4,200,770, issued Apr. 29, 1980 to Hellman et al., entitled "CRYPTOGRAPHIC APPARATUS AND METHOD." The '770 patent also disclosed the application of key pairs to the problem of key agreement over an insecure communication channel. The algorithms specified in the '770 patent rely for their security on the difficulty of the mathematical problem of finding a discrete logarithm. U.S. Pat. No. 4,200,770 is hereby incorporated by reference in its entirety.

In order to undermine the security of a discrete logarithm-based cryptographic algorithm, an adversary must be able to perform the inverse of modular exponentiation (i.e., a discrete logarithm). There are mathematical methods for finding a discrete logarithm (e.g., the Number Field Sieve), but these algorithms cannot be done in any reasonable time using sophisticated computers if certain conditions are met in the specification of the cryptographic algorithm.

In particular, it is necessary that the numbers involved be large enough. The larger the numbers used, the more time and computing power is required to find the discrete logarithm and break the cryptograph. On the other hand, very large numbers lead to very long public keys and transmissions of cryptographic data. The use of very large numbers also requires large amounts of time and computational power in order to perform the cryptographic algorithm. Thus, cryptographers are always looking for ways to minimize the size of the numbers involved, and the time and power required, in performing the encryption and/or authentication algorithms. The payoff for finding such a method is that cryptography can be done faster, cheaper, and in devices that do not have large amounts of computational power (e.g., handheld smart cards).

A discrete-logarithm based cryptographic algorithm can be performed in any mathematical setting in which certain algebraic rules hold true. In mathematical language, the setting must be a finite cyclic group. The choice of the group is critical in a cryptographic system. The discrete logarithm problem may be more difficult in one group than in another for which the numbers are of comparable size. The more difficult the discrete logarithm problem, the smaller the numbers that are required to implement the cryptographic algorithm. Working with smaller numbers is easier and faster than working with larger numbers. Using small numbers allows the cryptographic system to be higher performing (i.e., faster) and requires less storage. So, by choosing the right kind of group, a user may be able to work with smaller numbers, make a faster cryptographic system, and get the same, or better, cryptographic strength than from another cryptographic system that uses larger numbers.

The groups referred to above come from a setting called finite fields. Methods of adapting discrete logarithm-based algorithms to the setting of elliptic curves are known. However, finding discrete logarithms in this kind of group is particularly difficult. Thus, elliptic curve-based cryptographic algorithms can be implemented using much smaller numbers than in a finite field setting of comparable cryptographic strength. Thus, the use of elliptic curve cryptography is an improvement over finite field-based public-key cryptography.

In practice, an Elliptic Curve group over Fields F(p), denoted as E(p), is formed by choosing a pair of a and b coefficients, which are elements within F(p). The group consists of a finite set of points P(x,y) that satisfy the elliptic curve equation:

$$F(x,y) = y^2 - x^3 - ax - b = 0 \tag{1.1}$$

together with a point at infinity, O. The coordinates of the point, x and y, are elements of F(p) represented in N-bit strings. In what follows, a point is either written as a capital letter, e.g., P, or as a pair in terms of the affine coordinates, i.e., (x,y).

The Elliptic Curve Cryptosystem relies upon the difficulty of the Elliptic Curve Discrete Logarithm Problem (ECDLP)

to provide its effectiveness as a cryptosystem. Using multiplicative notation, the problem can be described as: given points B and Q in the group, find a number k such that $B^k=Q$, where k is called the discrete logarithm of Q to the base B. Using additive notation, the problem becomes: given two points B and Q in the group, find a number k such that kB=Q.

In an Elliptic Curve Cryptosystem, the large integer k is kept private and is often referred to as the secret key. The point Q together with the base point B are made public and are referred to as the public key. The security of the system, thus, relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

The core of elliptic curve geometric arithmetic is an operation called scalar multiplication, which computes kB by adding together k copies of the point B. Scalar multiplication is performed through a combination of point doubling and point addition operations. The point addition operation adds two distinct points together and the point doubling operation adds two copies of a point together. To compute, for example, 11B=(2*(2*(2B)))+3B=Q, it would take three point doublings and one point-addition.

Addition of two points on an elliptic curve is calculated as follows. When a straight line is drawn through the two points, the straight line intersects the elliptic curve at a third point. The point symmetric to this third intersecting point with respect to the x-axis is defined as a point resulting from the addition.

Doubling a point on an elliptic curve is calculated as follows. When a tangent line is drawn at a point on an elliptic curve, the tangent line intersects the elliptic curve at another point. The point symmetric to this intersecting point with respect to the x-axis is defined as a point resulting from the doubling.

Table 1 illustrates the addition rules for adding two points $(x_1,y_1)$ and $(x_2,y_2)$, that is, $$(x_3,y_3)=(x_1,y_1)+(x_2,y_2) \quad (1.2)$$

TABLE 1

Summary of Addition Rules

| | |
|---|---|
| General Equations | $x_3 = m^3 - x_2 - x_1$ |
| | $y_3 = m(x_3 - x_1) + y_1$ |
| Point Addition | $m = \dfrac{y_2 - y_1}{x_2 - x_1}$ |
| Point Doubling $(x_3, y_3) = 2(x_1, y_1)$ | $m = \dfrac{3x_1^2 - a}{2y_1}$ |
| $(x_2, y_2) = -(x, y_1)$ | $(x_3, y_3) = (x_1, y_1) + (-(x_1, y_1)) = O$ |
| $(x_2, y_2) = O$ | $(x_3, y_3) = (x_1, y_1) + O =$ |
| $-(x_1, y_1)$ | $(x_1, y_1) = (x_1, -y_1)$ |

Given a message point $(x_m, y_m)$, a base point $(x_B, y_B)$, and a given key, k, the cipher point $(x_C, y_C)$ is obtained using the following equation, $$(x_c,y_c)=(x_m,y_m)+k(x_B,y_B) \quad (1.3)$$

There are two basics steps in the computation of the above equations. The first is to find the scalar multiplication of the base point with the key, "$k(x_B,y_B)$". The resulting point is then added to the message point, $(x_m, y_m)$ to obtain the cipher point. At the receiver, the message point is recovered from: the cipher point, which is usually transmitted; the shared key; and the base point, that is $$(x_m,y_m)=(x_c,y_c)-k(x_B,y_B) \quad (1.4)$$

The steps of elliptic curve symmetric cryptography can be summarized as follows. Both the sender and receiver must agree on: (1) A random number, k, that will be the shared secret key for communication; and (2) A base point, $P=(X_B, Y_B)$.

At the sending correspondent, (1) Embed a message bit string into the x coordinate of an elliptic curve point, which is designated as the message point, $(x_m, y_m)$; (2) The cipher point $(x_c, Y_c)$ is computed using, $(x_c,y_C)=(x_m,y_m)+k(x_B,y_B)$; and (3) The appropriate bits of the x-coordinate and the sign bit of the y-coordinate of the cipher point $(x_c, y_c)$ are sent to the receiving entity.

At the receiving correspondent, the following steps are performed. (1) Using the shared key, k, and the base point $(x_B, y_B)$, the scalar multiplication $(x_{Bk}, y_{Bk})=k(x_B, y_B)$ is computed; (2) The message point $(x_m,y_m)$ is computed using $(x_m,y_m)=(x_c,y_c)+(-k(x_B,y_B))$; and (3) The secret message's bit string is recovered from $x_m$.

The steps of elliptic curve public-key cryptography can be summarized as follows. Both the sender and receiver must agree on (1) An elliptic curve; and (2) A base point, $P=(x_B, y_B)$. At the sending correspondent, (1) Embed a message bit string into the x-coordinate of an elliptic curve point, which is designated as the message point, $(x_m, y_m)$; (2) Using the private key of the sending correspondent, $k_{SPr}$, and the public key of the receiving correspondent, $k_{RPr}(x_b, y_b)$, compute the scalar multiplication $(x_{bk}, y_{bk})=k_{SPr}(k_{RPr}(x_b,y_b))$; (3) Compute a cipher point $(x_c,y_c)$ using $(x_c,y_c)=(x_m,y_m)+(x_{bk}, y_{bk})$; and (4) Send appropriate bits of the x-coordinate and the sign bit of the y-coordinate of the cipher point $(x_c,y_c)$ to the receiving correspondent.

At the receiving correspondent, (1) Using the private key of the receiving correspondent, $k_{RPr}$, and the public key of the sending correspondent, $k_{SPr}(x_b, y_b)$, compute the scalar multiplication $(x_{bk}, y_{bk})=k_{RPr}(k_{SPr}(x_b, y_b))$; (2) Compute the message point $(x_m,y_m)$ using $(x_m,y_m)=(x_c,y_c)-(x_{bk}, y_{bk})$; and (3) Recover the message bit string from $X_m$.

Scalar multiplication (SM) (or point multiplication) refers to computing the point:

$$KP=P+P+P+\ldots P \text{(sum taken } K \text{ times)}$$

on the elliptic curve over a given finite field. The integer K is referred to as "scalar" and the point P as the base point. Adding the point P to itself K times is not an efficient way to compute scalar multiplication. More efficient methods are based on a sequence of addition (ADD) and doubling (DBL) operations. The doubling operation is simply adding the point to itself.

The computation of the point KP processed by the scalar multiplication is performed using the binary expression of K represented by the equation:

$$K=k_{n-1}2^{n-1}+k_{n-2}2^{n-2}+\ldots+k_12+k_0, \quad (1.5)$$

where $k_i$ is the i-th bit of the binary representation of K, and n is the total number of bits.

There are two main methods of calculating KP. The Least-to-Most (LM) algorithm, which starts from the least significant bit of K, and the Most-to-Least (ML) algorithm which starts from the most significant bit of K. The LM and the ML algorithms are shown below.

Algorithm 1: Least-to-Most Binary Method Algorithm

```
INPUT      K, P
OUTPUT     KP
  1. Initialize Q[0] = O, Q[1] = P
  2. for i=0 to n−1
  3.   if k[i]==1 then
  4.     Q[0]=ADD(Q[0],Q[1])
  5.   end if
  6.   Q[1]=DBL(Q[1])
  7. end for
  8. return Q[0]
```

In the LM algorithm, Q[0] is initialized to the identity point O, and Q[1] is initialized to the base point P. If $k_i=1$, the elliptic curve addition, ADD, is performed on the points Q[0] and Q[1] in step 4, and the result is stored in the point Q[0]; otherwise, (i.e., for $k_i=0$) Q[0] remains unchanged. The elliptic curve doubling, DBL, is performed on the point Q[1] in step 6, and the result is stored in the point Q[I]. This point doubling operation in step 6 is performed in all cases, regardless of the scalar bit value.

Algorithm 2: Most-to-Least Binary Method Algorithm

```
INPUT      K, P
OUTPUT     KP
  1. Initialize Q[0] = P
  2. for i= n−2 downto 0
  3.   Q[0]=DBL(Q[0])
  4.   if k[i]==1 then
  5.     Q[0]=ADD(Q[0],P)
  6.   end if
  7. end for
  8. return Q[0]
```

The ML algorithm treats the bit string of K starting with the most significant bit first. Since the most significant bit is always 1, the ML algorithm starts from the nextmost bit, n−2, and initializes Q[0] to P. This kind of algorithm needs only one variable, Q[0]. First, the DBL operation is performed on Q[0], and the result is stored in Q[0], as shown in step 3. This point doubling in step 3 is performed regardless of the scalar bit value. If $k_i=1$, the ADD operation is performed on the point Q[0] and the base point P in step 5, and the result is stored in point Q[0]; otherwise, (i.e. for $k_i=0$) Q[0] remains unchanged.

The difficulty in solving the elliptic curve discrete logarithm problem has been established theoretically. However, information associated with secret information, such as the private key or the like, may leak out in cryptographic processing in real mounting. Thus, there has been proposed an attack method of so-called power analysis, in which the secret information is decrypted on the basis of the leaked information.

An attack method in which change in voltage is measured in cryptographic processing using secret information, such as DES (Data Encryption Standard) or the like, so that the process of the cryptographic processing is obtained and the secret information inferred on the basis of the obtained process, is called DPA (Differential Power Analysis).

As shown in Algorithm 1 and Algorithm 2, performing the ADD operation is conditioned by the key bit. If the scalar bit value is equal to one, an ADD operation is performed; otherwise, an ADD operation is not performed. Therefore, a simple power analysis (i.e., simple side channel analysis using power consumption as the side channel) will produce different power traces that distinguish between the existence of an ADD operation or not. This can reveal the bit values of the scalar.

One widely used approach to avoid this kind of leak to perform a dummy addition in the ML method when the processed bit is '0' so that each iteration appears as a doubling followed by an addition operation, which is called the "Double-and-ADD always algorithm", shown below for the ML technique as Algorithm 3, with a similar algorithm for the LM technique shown below as Algorithm 4.

Algorithm 3: ML Double-and-ADD always algorithm

```
INPUT      K,P
OUTPUT     KP
  1. Initialize Q[2]=P
  2. for i=n−2 downto 0
  3.   Q[0]=DBL(Q[2])
  4.   Q[1]=ADD(Q[0],P)
  5.   Q[2]=Q[k_i]
  6. end for
     return Q[2]
```

Algorithm 4: LM Double-and-ADD always algorithm

```
INPUT      K,P
OUTPUT     KP
  1. Initialize Q[2]=P
  2. for i=n−2 downto 0
  3.   Q[0]=DBL(Q[2])
  4.   Q[1]=ADD(Q[0],P)
  5.   Q[2]=Q[k_i]
  6. end for
     return Q[2]
```

Another ML algorithm to avoid this kind of leak is disclosed in U.S. Patent Application No. 2003/0123656, published Jul. 3, 2003, entitled "ELLIPTIC CURVE CRYPTOSYSTEM APPARATUS, STORAGE MEDIUM STORING ELLIPTIC CURVE CRYPTOSYSTEM PROGRAM, AND ELLIPTIC CURVE CRYPTOSYSTEM ARITHMETIC METHOD". This algorithm uses extra ADD operations to assure that the sequence of DBL and ADD operations is carried out in each iteration. We refer to this algorithm as Takagi's algorithm, shown below as Algorithm 5.

Algorithm 5: Takagi's ML algorithm

```
INPUT      K,P
OUTPUT     KP
  1. INITIALIZE Q[0]=P; Q[1]=2P
  2. for i=n−2 down to 0
  3.   Q[2]=DBL(Q[k_i])
  4.   Q[1]=ADD(Q[0],Q[1])
  5.   Q[0]=Q[2−k_i]
  6.   Q[1]=Q[1 + k_i]
  7. end for
     return Q[0]
```

Even if an algorithm is protected against single power analysis, it may succumb to the more sophisticated differential power analysis (DPA). Assume that the double-and-add always method is implemented with one of the previous algorithms given in Algorithms 3, 4 or 5. Representing the scalar value K in binary:

$$K = k_{n-1}2^{n-1} + k_{n-2}2^{n-2} + \ldots + k_i 2 + k_0, \quad (1.6)$$

where $k_i$ is the i-th bit of the binary representation of K, and n is the total number of bits. DPA is based on the assumption that an attacker already knows the highest bits, $k_{n-1}$, $k_{n-2}, \ldots k_{j+1}$ of K. Then, he guesses that the next bit $k_j$ is equal to '1', and then randomly chooses several points $P_1, \ldots, P_t$ and computes:

$$Q_r = \left(\sum_{i=j}^{n-1} k_i 2^{i-j}\right) P_r \quad \text{For } 1 \le r \le t. \qquad (2.1)$$

Based on statistical analysis of these points (i.e., $Q_r$, $1 \le r \le t$), he can decide whether his guess is correct or not. Once $k_j$ is known, the remaining bits, $k_{j-1}, k_{j-2}, \ldots, k_0$, are recovered recursively in the same way.

J. Coron proposed the following randomization-based countermeasures, which are effective against differential power analysis attacks: (1) Randomizing the base-point P by computing Q=kP as Q=(P+R)−kR for a random point R; (2) Using randomized projective coordinates, i.e., for a random number r≠0, the projective coordinates, (X, Y, Z) and (rX; rY, rZ) represent the same point, so that for a random number r, if $P=(x_0,y_0)$, Q is computed as $Q=k(rx_0, ry_0: r)$; (3) Randomizing the scalar K, i.e., if n=$ord_E$(P) denotes the order of P∈E(F(p)), then Q is computed as Q=(k+rn)P for a random r, or, alternatively, one can replace n by the order of the elliptic curve, #E(F(p)).

These countermeasures can be used with Coron's algorithm or Takagi's algorithm to protect scalar multiplication computation against both simple power attacks and differential power analysis attacks.

One of the crucial decisions when implementing an efficient elliptic curve cryptosystem over GF(p) is deciding which point coordinate system to use. The point coordinate system used for addition and doubling of points on the elliptic curve determines the efficiency of these routines, and hence the efficiency of the basic cryptographic operation, scalar multiplication.

There are many techniques proposed for fast implementations of elliptic curve cryptosystems. One of the most important techniques that can be used to enhance scalar multiplication is the idea of transferring the point coordinates into other coordinates that can eliminate the inverse operation.

Various coordinates can be used in order to eliminate the inverse operation in scalar multiplication and, hence, increase the speed of calculations. We still need one final inverse operation to return back to the normal (Affine) coordinates after completing scalar multiplication. There are potentially five different coordinate systems, which can be summarized as: Affine (A), Projective (P), Jacobian (J), Chudnovsky-jacobian (C), and Modified (M) coordinates. The computation times in terms of number of multiplication (M), squaring (S), and inverse (I) operations are computed for each coordinate system. For simplicity, the addition and subtraction operations are not considered, since they require very little time.

Affine Coordinates (A)

Affine coordinates are the simplest to understand and are used for communication between two parties because they require the lowest bandwidth. However, the modular inversions required when adding and doubling points that are represented using Affine coordinates cause them to be highly inefficient for use in addition and doubling of points. The other coordinate systems require at least one extra value to represent a point and do not require the use of modular inversions in point addition and doubling, but extra multiplication and squaring operations are required instead.

For Affine coordinates, let $$ECE: y^2 = x^3 + ax + b (a, b \in Fp, 4a^3 + 27b^2 \ne 0) \qquad (3.1)$$

be the equation of elliptic curve E over $F_p$. This equation will be referred to as ECE.

Let $P=(x_1,y_1)$, $Q=(x_2,y_2)$ be points on E. It is desired to find $R=P+Q=(x_3,y_3)$. The affine formulae for addition are given by:

$$x_3 = \lambda^2 - x_1 - x_2$$
$$y_3 = \lambda(x_1 - x_3) - y_1 \qquad (3.2)$$

Where: $\lambda = (y_2 - y_1)/(x_2 - x_1)$ and where P≠Q. The affine formulae for point doubling (R=2P) are given by:

$$x_3 = \lambda^2 - 2x_1$$
$$y_3 = \lambda(x_1 - x_3) - y_1 \qquad (3.3)$$

Where: $\lambda = (3x_1^2 + a)/(2y_1)$.

Projective Coordinates (P)

In projective coordinates, the following transformation is used:

$$x = \frac{X}{Z} \text{ and } y = \frac{Y}{Z}$$

The ECE becomes:

$$Y^2 Z = X^3 + aXZ^2 + bZ^3 \qquad (3.4)$$

In this case, the points P, Q, and R are represented as follows:

$$P=(X_1, Y_1, Z_1), Q=(X_2, Y_2, Z_2) \text{ and } R=P+Q=(X_3, Y_3, Z_3)$$

The addition formulae where P≠Q are given by:

$$X_3 = vA, Y_3 = u(v^2 X_1 Z_2 - A) - v^3 Y_1 Z_2, Z_3 = v^3 Z_1 Z_2 \qquad (3.5)$$

where:

$$u = Y_2 Z_1 - Y_1 Z_2, v = X_2 Z_1 - X_1 Z_2 \text{ and } A = u^2 Z_1 Z_2 - v^3 - 2v^2 X_1 Z_2$$

The doubling formula is given by:

$$X_3 = 2hs, Y_3 = w(4b-h) - 8Y_1^2 s^2, Z_3 = 8s^3 \qquad (3.6)$$

where $$w = aZ_1^2 + 3X_1^2, s = Y_1 Z_1, B = X_1 Y_1 s \text{ and } h = w^2 - 8B.$$

Jacobian Coordinates (J)

In Jacobian coordinates, the following transformation is used:

$$x = \frac{X}{Z^2} \text{ and } y = \frac{Y}{Z^3}$$

The ECE becomes:

$$Y^2 = X^3 + aXZ^4 + bZ^6$$

In this case, the points P, Q, and R have three coordinates X, Y, and Z as follows:

$$P=(X_1,Y_1,Z_1), Q=(X_2,Y_2,Z_2) \text{ and } R=P+Q=(X_3,Y_3,Z_3)$$

The addition formula, where $P \neq Q$, is given by:

$$X_3=-H^3-2U_1H^2+r^2, Y_3=-S_1H^3+r(U_1H^2-X_3),$$
$$Z_3=Z_1Z_2H \quad (3.7)$$

where:

$$U_1=X_1Z_2^2, U_2=X_2Z_1^2, S_1=Y_1Z_2^3, S_2=Y_2Z_1^3, H=U_2-U_1,$$
$$\text{and } r=S_2-S_1.$$

The doubling formula is given by:

$$X_3=T, Y_3=-8Y_1^4+M(S-T), Z_3=2Y_1Z_1 \quad (3.8)$$

where $$S=4X_1Y_1^2, M=3X_1^2+aZ_1^4, \text{ and } T=-2S+M^2.$$

Chudnovsky Jacobian Coordinates (C)

It is clear that Jacobian coordinates provide faster doubling and slower addition compared to projective coordinates. In order to speedup addition, D. V. Chudnovsky proposed the Chudnovsky Jacobian coordinates. In this coordinate system, a Jacobian point is represented internally as 5-tupel point (X, Y, Z, $Z_2$, $Z_3$). The transformation and ECE equations are the same as in Jacobian coordinates, while the points P, Q, and R represented as follows:

$$P=(X_1,Y_1,Z_1,Z_1^2,Z_1^3), Q=(X_2,Y_2,Z_2,Z_2^2,Z_2^3), \text{ and } R=P+Q=(X_3,Y_3,Z_3,Z_3^2,Z_3^3).$$

The main idea in Chudnovsky-jacobian coordinate is that the $Z_2$, $Z_3$ are ready for use from the previous iteration and there is no need to re-calculate them. In other words, $Z_1^2, Z_1^3, Z_2^2, Z_2^3$ are computed during the last iteration and fed to the current iteration as inputs, while $Z_3^2$, $Z_3^3$ need to be calculated. The addition formula for Chudnovsky-Jacobian coordinates, where $P \neq Q$, is given by:

$$X_3=-H^3-2U_1H^2+r^2, Y_3=-S_1H^3+r(U_1H^2-X_3),$$
$$Z_3=Z_1Z_2Z_3^2=Z_3^2, Z_3^3=Z_3^3, \quad (3.9)$$

where:

$U_1=X_1Z_2^2, U_2=X_2Z_1^2, S_1=Y_1Z_2^3, S_2=Y_2Z_1^3, H=U_2-U_1,$ and $r=S_2-S_1$. The doubling formula (R=2P) for Chudnovsky-jacobian coordinates is given by:

$$X_3=T, Y_3=-8Y_1^4+M(S-T), Z_3=2Y_1Z_1Z_3^2=Z_3^2, Z_3^3=Z_3^3, \quad (3.10)$$

where:

$$S=4X_1Y_1^2, M=3X_1^2+a(Z_1^2)^2, \text{ and } T=-2S+M^2.$$

Modified Jacobian Coordinates (M)

Henri Cohen et. al. modified the Jacobian coordinates and claimed that the modification resulted in the fastest possible point doubling. The term ($aZ^4$) is needed in doubling, rather than in addition. Taking this into consideration, the modified Jacobian coordinates employed the same idea of internally representing this term and providing it as input to the doubling formula. The point is represented in 4-tuple representation (X, Y, Z, $aZ^4$). It uses the same transformation equations used in Jacobian coordinates.

In modified Jacobian coordinates, the points P, Q, and R are represented as follows:

$$P=(X_1,Y_1,Z_1,aZ_1^4), Q=(X_2,Y_2,Z_2,aZ_2^4), \text{ and } R=P+Q=(X_3,Y_3,Z_3,aZ_3^4).$$

In modified Jacobian coordinates, the addition formula, where $P \neq Q$, is given by:

$$X_3=-H^3-2U_1H^2+r^2, Y_3=-S_1H^3+r(U_1H^2-X_3),$$
$$Z_3=Z_1Z_2H \text{ and } aZ_3^4=aZ_3^4, \quad (3.11)$$

where:

$$U_1=X_1Z_2^2, U_2=X_2Z_1^2, S_1=Y_1Z_2^3, S_2=Y_2Z_1^3, H=U_2-U_1,$$
$$\text{and } r=S_2-S_1.$$

The doubling formula in modified Jacobian coordinates is given by:

$$X_3=T, Y_3=M(S-T)-U, Z_3=2Y_1Z_1aZ_3^4=2U(aZ_1^4), \quad (3.12)$$

where:

$$S=4X_1Y_1^2, U=8Y_1^4, M=3X_1^2+aZ_1^4, \text{ and } T=-2S+M^2.$$

None of the above inventions, methodologies and patents, taken either singly or in combination, is seen to describe the instant invention as claimed. Thus, a method for elliptic curve scalar multiplication using parameterized projective coordinates solving the aforementioned problems is desired.

SUMMARY OF THE INVENTION

The method for elliptic curve scalar multiplication in an elliptic curve cryptosystem implemented over an insecure communications channel includes the steps of: (a) selecting positive integers $L_x$ and $L_y$, where $L_x$ and $L_y$ are not both equal to 1, and where $L_y \neq 3$ if $L_x=2$; (b) representing coordinates of a point P=(x,y) on an elliptic curve of the form $F(x,y)=y^2-x^3-ax-b=0$ defined over a finite field as projective coordinates according to transforms $$x = \frac{X}{Z^{L_x}} \text{ and } y = \frac{Y}{Z^{L_y}},$$

respectively, where X, Y and Z are orthogonal projective coordinates; and (c) adding together K copies, K being a scalar, of the point P(X,Y) to obtain the scalar multiplication product KP. The scalar multiplication product is then converted from parameterized projective coordinates $P(X,Y,Z^{L_x}, Z^{L_y})$ to affine coordinates P(x,y). The method is optimized by restricting $L_y$ so that $L_y-L_x \geq 0$ or, alternatively, so that $L_y=L_x$. The method may be carried out on a cryptographic device, which may be a computer, a (cellular) telephone, a smart card, an ASIC, or the like.

The method for elliptic curve scalar multiplication using parameterized projective coordinates allows a computing and/or encrypting device to select the projective coordinate system either at random, or according to a certain rule. The parameterized projective coordinate (PPC) method automates the selection of the projective coordinate system and uses a single mathematical formulation (which may be implemented in software code) to implement different projective coordinate systems.

Different projective coordinates can be implemented by using two parameters, where one parameter defines the projection of the x-coordinate and a second parameter defines the projection of the y-coordinate of an elliptic curve point. This process allows different projective coordinates to be used within the same mathematical formulation in calculating the same scalar multiplication. Thus, the computation of the same scalar multiplication can be randomized by simply varying either the x-coordinate projecting parameter and/or the y-coordinate projecting parameter. The PPC method does not require the sending and receiving correspondents to use the same projective coordinates in computing the same scalar multiplication.

In PPC, two values, namely $Z^{L_x}$ and $Z^{L_y}$, are used for projecting the x-coordinate and the y-coordinate, respectively, of a point. $L_x$ and $L_y$ are powers that can be chosen either at random or according to a certain criteria, such as a criteria for reducing the computation complexity.

To formulate the Parameterized Projective Coordinates, consider that there are N+1 degrees of powers for the Z-coordinate; i.e., from 0 to N as follows:

Degree-0 is the affine coordinate system P=(x,y);

$$\text{In Degree-1}, x = \frac{X}{Z}, \quad y = \frac{Y}{Z};$$

$$\text{In Degree-2}, x = \frac{X}{Z^2}, \quad y = \frac{Y}{Z^2};$$

$$\text{In Degree-}i, x = \frac{X}{Z^i}, \quad y = \frac{Y}{Z^i}; \text{ and}$$

$$\text{In Degree-}N, x = \frac{X}{Z^N}, \quad y = \frac{Y}{Z^N}.$$

In the PPC method, the x- and y-coordinates can be projected to any degree of the above degrees and not necessarily to the same degree. In other words, the x-coordinate can be in one degree while the y-coordinate may be in another degree, resulting in many combinations of coordinate systems.

$L_x$ and $L_y$ are degrees of the Z-coordinate, which can be chosen in the range from 1 to N. Based on this, we define the following Parameterized Transformation Functions (PTF):

$$x = \frac{X}{Z^{L_x}} \text{ and } y = \frac{Y}{Z^{L_y}}, \quad (4.2)$$

where, $0 < L_x \leq N$ and $0 < L_y \leq N$.

By substituting for x and y from equation (2.4) in the elliptic curve equation, E: $y^2 = x^3 + ax + b$, we get:

$$\frac{Y^2}{Z^{2L_y}} = \frac{X^3}{Z^{3L_x}} + a\frac{X}{Z^{L_x}} + b, \quad (4.3)$$

which can be written as $$\frac{Y^2}{Z^{2L_y}} = \frac{X^3 + aXZ^{2L_x} + bZ^{3L_x}}{Z^{3L_x}}$$

and simplified to $$Y^2 Z^{3L_x - 2L_y} = X^3 + aXZ^{2L_x} + bZ^{3L_x}. \quad (4.4)$$

It should be noted that if we set $L_x = L_y = 1$, then equation (4.4) becomes:

$$Y^2 Z = X^3 + aXZ^2 + bZ^3, \quad (4.5)$$

which is identical to homogenous projective coordinate equation (3.4) discussed above.

Equations for elliptic curve point addition and doubling may be derived and used for any values for $L_x$ and $L_y$, and, thus, the same mathematical formulation can be used to implement point addition and doubling using any projective coordinate. The appropriate projective coordinate is selected based on the values of projecting parameters $L_x$ and $L_y$.

These and other features of the present invention will become readily apparent upon further review of the following specification and drawings.

BRIEF DESCRIPTION OF THE DRAWINGS

The sole drawing FIGURE is a block diagram illustrating system components for implementing the method for elliptic curve scalar multiplication using parameterized projective coordinates according to the present invention.

These and other features of the present invention will become readily apparent upon further review of the following specification and drawings.

DETAILED DESCRIPTION OF THE PREFERRED EMBODIMENTS

The method for elliptic curve scalar multiplication in an elliptic curve cryptosystem implemented over an insecure communications channel includes the steps of: (a) selecting positive integers $L_x$ and $L_y$, where $L_x$ and $L_y$ are not both equal to 1, and where $L_y \neq 3$ if $L_x = 2$; (b) representing coordinates of a point P=(x,y) on an elliptic curve of the form $F(x,y) = y^2 - x^3 - ax - b = 0$ defined over a finite field as projective coordinates according to transforms $$x = \frac{X}{Z^{L_x}} \text{ and } y = \frac{Y}{Z^{L_y}},$$

respectively, where X, Y and Z are orthogonal projective coordinates; and (c) adding together K copies, K being a scalar, of the point P(X,Y) to obtain the scalar multiplication product KP. The scalar multiplication product is then converted from parameterized projective coordinates $P(X,Y,Z^{L_x}, Z^{L_y})$ to affine coordinates P(x,y). The method is optimized by restricting $L_y$ so that $L_y - L_x \geq 0$ or, alternatively, so that $L_y = L_x$. The method may be carried out on a cryptographic device, which may be a computer, a (cellular) telephone, a smart card, an ASIC, or the like.

The method for elliptic curve scalar multiplication using parameterized projective coordinates allows a computing and/or encrypting device to select the projective coordinate system either at random, or according to a certain rule. The parameterized projective coordinate (PPC) method automates the selection of the projective coordinate system and uses a single mathematical formulation (which may be implemented in software code) to implement different projective coordinate systems.

Different projective coordinates can be implemented by using two parameters, where one parameter defines the projection of the x-coordinate and a second parameter defines the projection of the y-coordinate of an elliptic curve point. This process allows different projective coordinates to be used within the same mathematical formulation in calculating the same scalar multiplication. Thus, the computation of the same scalar multiplication can be randomized by simply varying either the x-coordinate projecting parameter and/or the y-coordinate projecting parameter. The PPC method does not require the sending and receiving correspondents to use the same projective coordinates in computing the same scalar multiplication.

In PPC, two values, namely $Z^{L_x}$ and $Z^{L_y}$, are used for projecting the x-coordinate and the y-coordinate, respectively, of a point. $L_x$ and $L_y$ are powers that can be chosen either at random or according to a certain criteria, such as a criteria for reducing the computation complexity.

To formulate the Parameterized Projective Coordinates, consider that there are N+1 degrees of powers for the Z-coordinate; i.e., from 0 to N as follows:

Degree-0 is the affine coordinate system P=(x,y);

$$\text{In Degree-1}, x = \frac{X}{Z}, \quad y = \frac{Y}{Z};$$

$$\text{In Degree-2}, x = \frac{X}{Z^2}, \quad y = \frac{Y}{Z^2};$$

$$\text{In Degree-}i, x = \frac{X}{Z^i}, \quad y = \frac{Y}{Z^i}; \text{ and}$$

$$\text{In Degree-}N, x = \frac{X}{Z^N}, \quad y = \frac{Y}{Z^N}.$$

In the PPC method, the x- and y-coordinates can be projected to any degree of the above degrees and not necessarily to the same degree. In other words, the x-coordinate can be in one degree while the y-coordinate may be in another degree, resulting in many combinations of coordinate systems.

$L_x$ and $L_y$ are degrees of the Z-coordinate, which can be chosen in the range from 1 to N. Based on this, we define the following Parameterized Transformation Functions (PTF):

$$x = \frac{X}{Z^{L_x}} \text{ and } y = \frac{Y}{Z^{L_y}}, \qquad (4.2)$$

where, $0<L_x \leq N$ and $0<L_y \leq N$.

By substituting for x and y from equation (2.4) in the elliptic curve equation, E: $y^2 = x^3 + ax + b$, we get:

$$\frac{Y^2}{Z^{2L_y}} = \frac{X^3}{Z^{3L_x}} + a\frac{X}{Z^{L_x}} + b, \qquad (4.3)$$

which can be written as $$\frac{Y^2}{Z^{2L_y}} = \frac{X^3 + aXZ^{2L_x} + bZ^{3L_x}}{Z^{3L_x}}$$

and simplified to $$Y^2 Z^{3L_x - 2L_y} = X^3 + aXZ^{2L_x} + bZ^{3L_x} \qquad (4.4)$$

We note that if we set $L_x = L_y = 1$, then equation (4.4) becomes:

$$Y^2 Z = X^3 + aXZ^2 + bZ^3, \qquad (4.5)$$

which is identical to homogenous projective coordinate equation (3.4) discussed above.

Equations for elliptic curve point addition and doubling may be derived and used for any values for $L_x$ and $L_y$, and, thus, the same mathematical formulation can be used to implement point addition and doubling using any projective coordinate. The appropriate projective coordinate is selected based on the values of projecting parameters $L_x$ and $L_y$.

Addition

Further elaborating on the addition formulae in the PPC method, we let $P=(x_1,y_1)$ and $Q=(x_2,y_2)$ be two points satisfying the elliptic curve equation. Then, the affine coordinates of the point $R=(x_3,y_3)=P+Q$ are given by:

$$x_3 = \lambda^2 - x_1 - x_2 \qquad (4.6a)$$

$$y_3 = \lambda(x_1 - x_3) - y_1, \qquad (4.6b)$$

where $$\lambda = \frac{y_2 - y_1}{x_2 - x_1}.$$

The parameterized transformation functions shown in equations (4.2) are used to get the parameterized projective coordinates $(X_3, Y_3, Z_3^{L_x}, Z_3^{L_y})$ of the point R according to equations (4.6a) and (4.6b). The derivations of $X_3$ and $Y_3$ are given below.

In order to derive $X_3$ from $x_3$, we consider applying the parameterized transformation functions shown in equation (4.2) to the x-coordinate equation (4.6a), letting $P=(X_1,Y_1,Z_1^{L_x},Z_1^{L_y})$, $Q=(X_2,Y_2,Z_2^{L_x},Z_2^{L_y})$ and $R=(X_3,Y_3,Z_3^{L_x},Z_3^{L_y})$. Then, the projected $X_3$ coordinate of the point $R=P+Q$ can be derived as follows.

By applying the parameterized transformation functions of equation (4.2) to equation (4.6a), we get:

$$\frac{X_3}{Z_3^{L_x}} = \left( \frac{\frac{Y_2}{Z_2^{L_y}} - \frac{Y_1}{Z_1^{L_y}}}{\frac{X_2}{Z_2^{L_x}} - \frac{X_1}{Z_1^{L_x}}} \right)^2 - \frac{X_1}{Z_1^{L_x}} - \frac{X_2}{Z_2^{L_x}}.$$

We then unify the denominators to get:

$$= \left( \frac{\frac{Y_2 Z_1^{L_y} - Y_1 Z_2^{L_y}}{Z_1^{L_y} Z_2^{L_y}}}{\frac{X_2 Z_1^{L_x} - X_1 Z_2^{L_x}}{Z_1^{L_x} Z_2^{L_x}}} \right)^2 - \frac{X_1 Z_2^{L_x} + X_2 Z_1^{L_x}}{Z_1^{L_x} Z_2^{L_x}}$$

$$= \left( \frac{(Y_2 Z_1^{L_y} - Y_1 Z_2^{L_y})(Z_1^{L_x} Z_2^{L_x})}{(X_2 Z_1^{L_x} - X_1 Z_2^{L_x})(Z_1^{L_y} Z_2^{L_y})} \right)^2 - \frac{X_1 Z_2^{L_x} + X_2 Z_1^{L_x}}{Z_1^{L_x} Z_2^{L_x}}.$$

Next, we let $U = Y_2 Z_1^{L_y} - Y_1 Z_2^{L_y}$, $V = X_2 Z_1^{L_x} - X_1 Z_2^{L_x}$ and $S = X_2 Z_1^{L_x} + X_1 Z_2^{L_x}$, so that we now have:

$$\frac{X_3}{Z_3^{L_x}} = \frac{U^2 (Z_1^{L_x} Z_2^{L_x})^2}{V^2 (Z_1^{L_y} Z_2^{L_y})^2} - \frac{S}{Z_1^{L_x} Z_2^{L_x}}$$

$$= \frac{U^2 (Z_1^{L_x} Z_2^{L_x})^3 - SV^2 (Z_1^{L_y} Z_2^{L_y})^2}{V^2 (Z_1^{L_y} Z_2^{L_y})^2 Z_1^{L_x} Z_2^{L_x}}.$$

We then let $X'_3 = U^2(Z_1^{L_x} Z_2^{L_x})^3 - SV^2(Z_1^{L_y} Z_2^{L_y})^2$, (4.7)

so that:

$$\frac{X_3}{Z_3^{L_x}} = \frac{X'_3}{V^2(Z_1^{L_y} Z_2^{L_y})^2 Z_1^{L_x} Z_2^{L_x}}. \qquad (4.8)$$

In order to derive $Y_3$ from $y_3$, we consider applying the parameterized transformation functions shown in equation (4.2) to the y-coordinate equation (4.6b). We let $P=(X_1,Y_1,Z_1^{L_x},Z_1^{L_y})$, $Q=(X_2,Y_2,Z_2^{L_x},Z_2^{L_y})$ and $R=(X_3,Y_3,Z_3^{L_x},Z_3^{L_y})$. Then, the projected $Y_3$ coordinate of the point $R=P+Q$ can be derived as follows.

By applying the parameterized transformation functions of equation (4.2) to equation (4.6b), we get:

$$\frac{Y_3}{Z_3^{L_y}} = \left(\frac{\frac{Y_2}{Z_2^{L_y}} - \frac{Y_1}{Z_1^{L_y}}}{\frac{X_2}{Z_2^{L_x}} - \frac{X_1}{Z_1^{L_x}}}\right)\left(\frac{X_1}{Z_1^{L_x}} - \frac{X_3}{Z_3^{L_x}}\right) - \frac{Y_1}{Z_1^{L_y}}$$

$$= \left(\frac{(Y_2Z_1^{L_y} - Y_1Z_2^{L_y})(Z_1^{L_x}Z_2^{L_x})}{(X_2Z_1^{L_x} - X_1Z_2^{L_x})(Z_1^{L_y}Z_2^{L_y})}\right)\left(\frac{X_1}{Z_1^{L_x}} - \frac{X_3}{Z_3^{L_x}}\right) - \frac{Y_1}{Z_1^{L_y}}$$

$$= \left(\frac{U(Z_1^{L_x}Z_2^{L_x})}{V(Z_1^{L_y}Z_2^{L_y})}\right)\left(\frac{X_1}{Z_1^{L_x}} - \frac{X_3}{Z_3^{L_x}}\right) - \frac{Y_1}{Z_1^{L_y}}.$$

We then unify denominators to get:

$$\frac{Y_3}{Z_3^{L_y}} = \left(\frac{U(Z_1^{L_x}Z_2^{L_x})}{V(Z_1^{L_y}Z_2^{L_y})}\right)\left(\frac{X_1Z_3^{L_x} - X_3Z_1^{L_x}}{Z_1^{L_x}Z_3^{L_x}}\right) - \frac{Y_1}{Z_1^{L_y}}$$

$$= \frac{U(Z_1^{L_x}Z_2^{L_x})(X_1Z_3^{L_x} - X_3Z_1^{L_x})}{V(Z_1^{L_y}Z_2^{L_y})Z_1^{L_x}Z_3^{L_x}} - \frac{Y_1}{Z_1^{L_y}}$$

$$= \frac{UZ_2^{L_x}(X_1Z_3^{L_x} - X_3Z_1^{L_x}) - Y_1VZ_2^{L_y}Z_3^{L_x}}{V(Z_1^{L_y}Z_2^{L_y})Z_3^{L_x}}$$

$$= \frac{Z_3^{L_x}(UZ_2^{L_x}X_1 - Y_1VZ_2^{L_y}) - X_3UZ_2^{L_x}Z_1^{L_x}}{V(Z_1^{L_y}Z_2^{L_y})Z_3^{L_x}}.$$

Next, we let $Y'_3 = Z_3^{L_x}(UZ_2^{L_x}X_1 - Y_1VZ_2^{L_y}) - X_3UZ_2^{L_x}Z_1^{L_x}$ (4.9)

so that $$\frac{Y_3}{Z_3^{L_y}} = \frac{Y'_3}{V(Z_1^{L_y}Z_2^{L_y})Z_3^{L_x}}. \quad (4.10)$$

In order to choose a common $Z_3$ and clear the denominators of equations (4.8) and (4.10), we let $R=V(Z_1^{L_y}Z_2^{L_y})$ and then multiply the right-hand side of equation (4.8) by $$\frac{R(Z_1^{L_x}Z_2^{L_x})^{L_x-1}}{R(Z_1^{L_x}Z_2^{L_x})^{L_x-1}}$$

to yield $$\frac{X_3}{Z_3^{L_x}} = \frac{X'_3 R(Z_1^{L_x}Z_2^{L_x})^{L_x-1}}{R^2 Z_1^{L_x}Z_2^{L_x} R(Z_1^{L_x}Z_2^{L_x})^{L_x-1}} = \frac{X'_3 R(Z_1^{L_x}Z_2^{L_x})^{L_x-1}}{R^3(Z_1^{L_x}Z_2^{L_x})^{L_x}}, \quad (4.11)$$

which can be written as:

$$\frac{X_3}{Z_3^{L_x}} = \frac{X'_3 R(Z_1^{L_x}Z_2^{L_x})^{L_x-1} R^{3L_x-3}}{(R^3(Z_1^{L_x}Z_2^{L_x}))^{L_x}}. \quad (4.12)$$

Next, realizing that equation (4.10) can be written as:

$$\frac{Y_3}{Z_3^{L_y}} = \frac{Y'_3}{RZ_3^{L_x}}, \quad (4.13)$$

we can choose $Z_3=R^3(Z_1^{L_x}Z_2^{L_x})$, which results in the conditions:

$$Z_3^{L_x}=(R^3(Z_1^{L_x}Z_2^{L_x}))^{L_x} \text{ and } Z_3^{L_y}=(R^3(Z_1^{L_x}Z_2^{L_x}))^{L_y}. \quad (4.14)$$

From equation (4.12), we have $Z_3^{L_x}=(R^3(Z_1^{L_x}Z_2^{L_x}))^{L_x}$ and $X_3=X'_3R(R^3(Z_1^{L_x}Z_2^{L_x}))^{L_x-1}$. In equation (4.9) for $Y'_3$, we can take $RZ_1^{L_x}Z_2^{L_x}(R^3(Z_1^{L_x}Z_2^{L_x}))^{L_x-1}$ as a common factor from $Z_3^{L_x}$ and $X_3$ and rewrite equation (4.9) as:

$Y'_3 = (R^3(Z_1^{L_x}Z_2^{L_x}))^{L_x}(UZ_2^{L_x}X_1 - Y_1VZ_2^{L_y}) - X'_3R(R^3(Z_1^{L_x}Z_2^{L_x}))^{L_x-1}UZ_2^{L_x}Z_1^{L_x}$ $Y'_3 = RZ_1^{L_x}Z_2^{L_x}(R^3(Z_1^{L_x}Z_2^{L_x}))^{L_x-1}(R^2(UZ_2^{L_x}X_1 - Y_1VZ_2^{L_y}) - X'_3U).$

Letting $Y''_3 = R^2(UZ_2^{L_x}X_1 - Y_1VZ_2^{L_y}) - X'_3U$, then $Y'_3 = RZ_1^{L_x}Z_2^{L_x}(R^3(Z_1^{L_x}Z_2^{L_x}))^{L_x-1}Y''_3$. Thus, equation (4.13) can be written as:

$$\frac{Y_3}{Z_3^{L_y}} = \frac{RZ_2^{L_x}Z_1^{L_x}(R^3(Z_1^{L_x}Z_2^{L_x}))^{L_x-1}Y''_3}{R(R^3(Z_1^{L_x}Z_2^{L_x}))^{L_x}}, \quad (4.15)$$

which can be simplified to:

$$\frac{Y_3}{Z_3^{L_y}} = \frac{Z_1^{L_x}Z_2^{L_x}Y''_3}{R^3(Z_1^{L_x}Z_2^{L_x})}. \quad (4.16)$$

Finally, equation (4.15) can be written as:

$$\frac{Y_3}{Z_3^{L_y}} = \frac{Z_1^{L_x}Z_2^{L_x}Y''_3(R^3(Z_1^{L_x}Z_2^{L_x}))^{L_y-1}}{(R^3(Z_1^{L_x}Z_2^{L_x}))^{L_y}}. \quad (4.17)$$

From equations (4.12) and (4.17), we obtain the following addition formulae (4.18):

$$\left.\begin{array}{l} X_3 = X'_3 R(Z_1^{L_x}Z_2^{L_x})^{L_x-1} R^{3L_x-3} \\ Y_3 = Z_1^{L_x}Z_2^{L_x}Y''_3(R^3(Z_1^{L_x}Z_2^{L_x}))^{L_y-1} \\ Z_3 = R^3(Z_1^{L_x}Z_2^{L_x}) \\ Z_3^{L_x} = (R^3(Z_1^{L_x}Z_2^{L_x}))^{L_x} \\ Z_3^{L_y} = (R^3(Z_1^{L_x}Z_2^{L_x}))^{L_y} \\ \text{where, } U = Y_2Z_1^{L_y} - Y_1Z_2^{L_y}, \quad V = X_2Z_1^{L_x} - X_1Z_2^{L_x}, \\ S = X_2Z_1^{L_x} + X_1Z_2^{L_x}, \quad R = (VZ_1^{L_y}Z_2^{L_y}) \\ X'_3 = U^2(Z_1^{L_x}Z_2^{L_x})^3 - SV^2(Z_1^{L_y}Z_2^{L_y})^2, \\ Y''_3 = R^2(UZ_2^{L_x}X_1 - Y_1VZ_2^{L_y}) - X'_3U \end{array}\right\}$$

Doubling

In order to examine the doubling formulae in parameterized projective coordinates, we let $P=(x_1,y_1)$ be a point satisfying the elliptic curve equation. The affine coordinates of the point $R=(x_3,y_3)=2P$ are given by $x_3=\lambda^2-2x_1$ (4.19a)

$y_3=\lambda(x_1-x_3)-y_1$, (4.19b)

where $$\lambda = \frac{3x_1^2 + a}{2y_1}.$$

The parameterized transformation functions shown in equations (4.2) are used to obtain the parameterized projected coordinates $(X_3,Y_3,Z_3^{L_x},Z_3^{L_y})$ of the point R according to the above equations. The derivations of $X_3$ and $Y_3$ are given as follows.

In order to examine the derivation of the parameterized projective coordinates of $X_3$, we consider applying the parameterized transformation functions shown in equation (4.2) to the x-coordinate equation (4.19a). We let $P=(X_1,Y_1,Z_1^{L_x},Z_1^{L_y})$ and $R=(X_3,Y_3,Z_3^{L_x},Z_3^{L_y})$, then the projected $X_3$ coordinate of the point R=2P can be derived as follows:

By applying the parameterized transformation equation (4.2) to equation (4.19a), we obtain:

$$\frac{X_3}{Z_3^{L_x}} = \left(\frac{3\frac{X_1^2}{Z_1^{2L_x}} + a}{2\frac{Y_1}{Z_1^{L_y}}}\right)^2 - 2\frac{X_1}{Z_1^{L_x}}$$

$$= \left(\frac{\frac{3X_1^2 + aZ_1^{2L_x}}{Z_1^{2L_x}}}{2\frac{Y_1}{Z_1^{L_y}}}\right)^2 - 2\frac{X_1}{Z_1^{L_x}}$$

$$= \left(\frac{(3X_1^2 + aZ_1^{2L_x})Z_1^{L_y}}{2Z_1^{2L_x}Y_1}\right)^2 - 2\frac{X_1}{Z_1^{L_x}}.$$

Letting $W=3X_1^2+aZ_1^{L_x}$, then we have $$\frac{X_3}{Z_3^{L_x}} = \frac{(WZ_1^{L_y})^2}{(2Z_1^{2L_x}Y_1)^2} - 2\frac{X_1}{Z_1^{L_x}}$$

$$= \frac{(WZ_1^{L_y})^2 - 8X_1Z_1^{3L_x}Y_1^2}{(2Z_1^{2L_x}Y_1)^2}.$$

Letting $S=2Z_1^{2L_x}Y_1$, then $$\frac{X_3}{Z_3^{L_x}} = \frac{(WZ_1^{L_y})^2 - 4SX_1Y_1Z_1^{L_x}}{S^2},$$

and letting $X'_3=(WZ_1^{L_y})^2-4SX_1Y_1Z_1^{L_x}$, we obtain $$\frac{X_3}{Z_3^{L_x}} = \frac{X'_3}{S^2}. \qquad (4.20)$$

Similarly, in order to derive the parameterized projective coordinate $Y_3$, we consider applying the parameterized transformation functions shown in equation (4.2) to the y-coordinate equation (4.19b). We let $P=(X_1,Y_1,Z_1^{L_x},Z_1^{L_y})$ and $R=(X_3,Y_3,Z_3^{L_x},Z_3^{L_y})$. Then, the projected $Y_3$ coordinate of the point R=2P can be derived as follows:

By applying the parameterized transformation functions of equation (4.2) to equation (4.19b), we obtain:

$$\frac{Y_3}{Z_3^{L_y}} = \left(\frac{3\frac{X_1^2}{Z_1^{2L_x}} + a}{2\frac{Y_1}{Z_1^{L_y}}}\right)\left(\frac{X_1}{Z_1^{L_x}} - \frac{X_3}{Z_3^{L_x}}\right) - \frac{Y_1}{Z_1^{L_y}}$$

$$= \left(\frac{(WZ_1^{L_y})}{(2Z_1^{2L_x}Y_1)}\right)\left(\frac{X_1}{Z_1^{L_x}} - \frac{X_3}{Z_3^{L_x}}\right) - \frac{Y_1}{Z_1^{L_y}}.$$

Unifying the denominators results in:

$$\frac{Y_3}{Z_3^{L_y}} = \frac{(WZ_1^{L_y})(X_1Z_3^{L_x} - X_3Z_1^{L_x})}{2Z_1^{3L_x}Y_1Z_3^{L_x}} - \frac{Y_1}{Z_1^{L_y}}$$

$$= \frac{Z_1^{L_y}(WZ_1^{L_y})(X_1Z_3^{L_x} - X_3Z_1^{L_x}) - 2Y_1Z_1^{3L_x}Y_1Z_3^{L_x}}{2Z_1^{3L_x}Z_1^{L_y}Y_1Z_3^{L_x}},$$

which can be rearranged to obtain $$\frac{Y_3}{Z_3^{L_y}} = \frac{Z_3^{L_x}(WX_1Z_1^{2L_y} - SZ_1^{L_x}Y_1) - X_3WZ_1^{2L_y}Z_1^{L_x}}{SZ_1^{L_x}Z_1^{L_y}Z_3^{L_x}}.$$

Letting $Y'_3=Z_3^{L_x}(WX_1Z_1^{2L_y}-SZ_1^{L_x}Y_1)-X_3WZ_1^{2L_y}Z_1^{L_x}$, (4.21)

then $$\frac{Y_3}{Z_3^{L_y}} = \frac{Y'_3}{SZ_1^{L_x}Z_1^{L_y}Z_3^{L_x}}. \qquad (4.22)$$

To choose a common $Z_3$ and clear the denominators of equations (4.20) and (4.22), we multiply the right-hand side of equation (4.20) by $$\frac{SZ_1^{L_x}Z_1^{L_y}}{SZ_1^{L_x}Z_1^{L_y}}$$

to obtain:

$$\frac{X_3}{Z_3^{L_x}} = \frac{X'_3SZ_1^{L_x}Z_1^{L_y}}{S^3Z_1^{L_x}Z_1^{L_y}},$$

which can be written as:

$$\frac{X_3}{Z_3^{L_x}} = \frac{X'_3SZ_1^{L_x}Z_1^{L_y}(S^3Z_1^{L_x}Z_1^{L_y})^{L_x-1}}{(S^3Z_1^{L_x}Z_1^{L_y})^{L_x}}. \qquad (4.23)$$

Next, we choose $Z_3=S^3Z_1^{L_x}Z_1^{L_y}$, which yields:

$Z_3^{L_x}=(S^3Z_1^{L_x}Z_1^{L_y})^{L_x}$ and $Z_3^{L_y}=(S^3Z_1^{L_x}Z_1^{L_y})^{L_y}$. (4.24)

From equation (4.23), we have $Z_3^{L_x}=(S^3Z_1^{L_x}Z_1^{L_y})^{L_x}$ and $X_3=X'_3SZ_1^{L_x}Z_1^{L_y}(S^3Z_1^{L_x}Z_1^{L_y})^{L_x-1}$. In the y-coordinate equation for $Y'_3$, i.e., equation (4.21), we can take $SZ_1^{L_x}Z_1^{L_y}(S^3Z_1^{L_x}Z_1^{L_y})^{L_x-1}$ as a common factor from $Z_3^{L_x}$ and $X_3$ and rewrite equation (4.21) as:

$$Y'_3 = SZ_1^{L_x}Z_1^{L_y}(S^3Z_1^{L_x}Z_1^{L_y})^{L_x-1}(S^2(WX_1Z_1^{2L_y} - SZ_1^{L_y}Y_1) - X'_3WZ_1^{2L_y}Z_1^{L_x}).$$

Letting $Y''_3=S^2(WX_1Z_1^{2L_y}-SZ_1^{L_x}Y_1)-X'_3WZ_1^{2L_y}Z_1^{L_x}$, then $Y'_3=SZ_1^{L_x}Z_1^{L_y}(S^3Z_1^{L_x}Z_1^{L_y})^{L_x-1}Y''_3$. Therefore, the equation (4.22) can be written as:

$$\frac{Y_3}{Z_3^{L_y}} = \frac{SZ_1^{L_x}Z_1^{L_y}(S^3Z_1^{L_x}Z_1^{L_y})^{L_x-1}Y''_3}{SZ_1^{L_x}Z_1^{L_y}(S^3Z_1^{L_x}Z_1^{L_y})^{L_x}} = \frac{Y''_3}{S^3Z_1^{L_x}Z_1^{L_y}}. \quad (4.25)$$

Finally, equation (4.25) can be written as:

$$\frac{Y_3}{Z_3^{L_y}} = \frac{Y''_3(S^3Z_1^{L_x}Z_1^{L_y})^{L_y-1}}{(S^3Z_1^{L_x}Z_1^{L_y})^{L_y}}. \quad (4.26)$$

From equations (4.23) and (4.26), we obtain the following set of doubling formulae (4.27):

$$\begin{aligned}
X_3 &= X'_3SZ_1^{L_x}Z_1^{L_y}(S^3Z_1^{L_x}Z_1^{L_y})^{L_x-1} \\
Y_3 &= Y''_3(S^3Z_1^{L_x}Z_1^{L_y})^{L_y-1} \\
Z_3 &= S^3Z_1^{L_x}Z_1^{L_x} \\
Z_3^{L_x} &= (S^3Z_1^{L_x}Z_1^{L_y})^{L_x} \\
Z_3^{L_y} &= (S^3Z_1^{L_x}Z_1^{L_y})^{L_y} \\
\text{Where, } W &= 3X_1^2 + aZ_1^{2L_x}, \quad S = 2Z_1^{2L_x}Y_1 \\
X'_3 &= (WZ_1^{L_y})^2 - 4SX_1Z_1^{L_x} \\
Y''_3 &= S^2(WX_1Z_1^{2L_y} - SZ_1^{L_x}Y_1) - X'_3WZ_1^{2L_y}Z_1^{L_x}
\end{aligned}$$

Optimized Addition

The addition formulae of (4.18) are the most general formulae that can operate without any restriction in the values of the projecting parameters $L_x$ and $L_y$. However, their computation complexity can be reduced by reproducing these formulae, taking $Z_1$ and $Z_2$ as common factors in each equation (whenever it is possible), and simplifying the resultant formulae through the elimination of unnecessary terms. This results in the existence of terms such as $Z_1^{L_y-L_x}$, in which the exponent is a relation between $L_x$ and $L_y$. The derivation of optimized addition formulae is given below.

In order to derive the parameterized projective coordinates of equation (4.6a) (for $X_3$), we consider applying the parameterized transformation functions shown in equation (4.2) to the x-coordinate equation (4.6a). Letting $P=(X_1,Y_1,Z_1^{L_x},Z_1^{L_y})$, $Q=(X_2,Y_2,Z_2^{L_x},Z_2^{L_y})$ and $R=(X_3,Y_3,Z_3^{L_x},Z_3^{L_y})$, then the projected $X_3$ coordinate of the point $R=P+Q$ can be derived as follows:

By applying the parameterized transformation functions of equation (4.2) to equation (4.6a), we obtain:

$$\frac{X_3}{Z_3^{L_x}} = \left(\frac{\frac{Y_2}{Z_2^{L_y}} - \frac{Y_1}{Z_1^{L_y}}}{\frac{X_2}{Z_2^{L_x}} - \frac{X_1}{Z_1^{L_x}}}\right)^2 - \frac{X_1}{Z_1^{L_x}} - \frac{X_2}{Z_2^{L_x}}.$$

Unifying denominators results in:

$$= \left(\frac{\frac{Y_2Z_1^{L_y} - Y_1Z_2^{L_y}}{Z_1^{L_y}Z_2^{L_y}}}{\frac{X_2Z_1^{L_x} - X_1Z_2^{L_x}}{Z_1^{L_x}Z_2^{L_x}}}\right)^2 - \frac{X_1Z_2^{L_x} + X_2Z_1^{L_x}}{Z_1^{L_x}Z_2^{L_x}}$$

$$= \left(\frac{(Y_2Z_1^{L_y} - Y_1Z_2^{L_y})(Z_1^{L_x}Z_2^{L_x})}{(X_2Z_1^{L_x} - X_1Z_2^{L_x})(Z_1^{L_y}Z_2^{L_y})}\right)^2 - \frac{X_1Z_2^{L_x} + X_2Z_1^{L_x}}{Z_1^{L_x}Z_2^{L_x}}.$$

Next, we let $U=Y_2Z_1^{L_y}-Y_1Z_2^{L_y}$, $V=X_2Z_1^{L_x}-X_1Z_2^{L_x}$ and $S=X_2Z_1^{L_x}+X_1Z_2^{L_x}$, so that $$\frac{X_3}{Z_3^{L_x}} = \frac{U^2}{V^2(Z_1^{L_y-L_x}Z_2^{L_y-L_x})^2} - \frac{S}{Z_1^{L_x}Z_2^{L_x}}$$

$$= \frac{U^2Z_1^{L_x}Z_2^{L_x} - SV^2(Z_1^{L_y-L_x}Z_2^{L_y-L_x})^2}{V^2(Z_1^{L_y-L_x}Z_2^{L_y-L_x})^2Z_1^{L_x}Z_2^{L_x}}.$$

Letting $X'_3=U^2Z_1^{L_x}Z_2^{L_x}-SV^2(Z_1^{L_y-L_x}Z_2^{L_y-L_x})^2$, (5.7)

then:

$$\frac{X_3}{Z_3^{L_x}} = \frac{X'_3}{V^2(Z_1^{L_y-L_x}Z_2^{L_y-L_x})^2Z_1^{L_x}Z_2^{L_x}}. \quad (5.8)$$

Similarly, in order to derive the parameterized projective coordinates of equation (4.6b) (for $Y_3$), we consider applying the parameterized transformation functions shown in equation (4.2) to the y-coordinate equation (4.6b). We let $P=(X_1,Y_1,Z_1^{L_x},Z_1^{L_y})$, $Q=(X_2,Y_2,Z_2^{L_x},Z_2^{L_y})$ and $R=(X_3,Y_3,Z_3^{L_x},Z_3^{L_y})$, then the projected $Y_3$ coordinate of the point $R=P+Q$ can be derived as follows.

By applying the parameterized transformation functions of equation (4.2) to equation (4.6b), we obtain:

$$\frac{Y_3}{Z_3^{L_y}} = \left(\frac{\frac{Y_2}{Z_2^{L_y}} - \frac{Y_1}{Z_1^{L_y}}}{\frac{X_2}{Z_2^{L_x}} - \frac{X_1}{Z_1^{L_x}}}\right)\left(\frac{X_1}{Z_1^{L_x}} - \frac{X_3}{Z_3^{L_x}}\right) - \frac{Y_1}{Z_1^{L_y}}$$

$$= \left(\frac{(Y_2Z_1^{L_y} - Y_1Z_2^{L_y})}{(X_2Z_1^{L_x} - X_1Z_2^{L_x})(Z_1^{L_y-L_x}Z_2^{L_y-L_x})}\right)\left(\frac{X_1}{Z_1^{L_x}} - \frac{X_3}{Z_3^{L_x}}\right) - \frac{Y_1}{Z_1^{L_y}}$$

$$= \left(\frac{U}{V(Z_1^{L_y-L_x}Z_2^{L_y-L_x})}\right)\left(\frac{X_1}{Z_1^{L_x}} - \frac{X_3}{Z_3^{L_x}}\right) - \frac{Y_1}{Z_1^{L_y}}.$$

Unifying denominators results in:

$$\frac{Y_3}{Z_3^{L_y}} = \left(\frac{U}{V(Z_1^{L_y-L_x}Z_2^{L_y-L_x})}\right)\left(\frac{X_1Z_3^{L_x} - X_3Z_1^{L_x}}{Z_1^{L_x}Z_3^{L_x}}\right) - \frac{Y_1}{Z_1^{L_y}}$$

$$= \frac{U(X_1Z_3^{L_x} - X_3Z_1^{L_x})}{VZ_1^{L_y}Z_2^{L_y-L_x}Z_3^{L_x}} - \frac{Y_1}{Z_1^{L_y}}$$

$$= \frac{U(X_1Z_3^{L_x} - X_3Z_1^{L_x}) - Y_1VZ_2^{L_y-L_x}Z_3^{L_x}}{VZ_1^{L_y}Z_2^{L_y-L_x}Z_3^{L_x}}$$

$$= \frac{Z_3^{L_x}(UX_1 - Y_1VZ_2^{L_y-L_x}) - X_3UZ_1^{L_x}}{VZ_1^{L_y}Z_2^{L_y-L_x}Z_3^{L_x}}.$$

Letting $Y'_3 = Z_3^{L_x}(UX_1 - Y_1VZ_2^{L_y-L_x}) - X_3UZ_1^{L_x}$ (5.9)

results in:

$$\frac{Y_3}{Z_3^{L_y}} = \frac{Y'_3}{VZ_1^{L_y}Z_2^{L_y-L_x}Z_3^{L_x}}. \quad (5.10)$$

To choose a common $Z_3$ and clear the denominators of equation (5.8) and equation (5.10), we let $R = V(Z_1^{L_y}Z_2^{L_y})$ and multiply the right-hand side of equation (5.8) by $$\frac{Z_1^{L_x}Z_2^{L_x}}{Z_1^{L_x}Z_2^{L_x}}$$

to obtain:

$$\frac{X_3}{Z_3^{L_x}} = \frac{X'_3Z_1^{L_x}Z_2^{L_x}}{V^2(Z_1^{L_y}Z_2^{L_y})^2} = \frac{X'_3Z_1^{L_x}Z_2^{L_x}}{R^2}. \quad (5.11)$$

Next, we multiply the right-hand side of equation (5.10) by $$\frac{Z_2^{L_x}}{Z_2^{L_x}}$$

to yield $$\frac{Y_3}{Z_3^{L_y}} = \frac{Y'_3Z_2^{L_x}}{VZ_1^{L_y}Z_2^{L_y}Z_3^{L_x}} = \frac{Y'_3Z_2^{L_x}}{RZ_3^{L_x}}. \quad (5.12)$$

Equation (5.12) has an extra R in its denominator. In order to clear this R, we have to extract an R from $Y'_3$ to cancel it with the R in the denominator. Thus, we multiply the right-hand side of equation (5.11) by R/R to obtain $$\frac{X_3}{Z_3^{L_x}} = \frac{X'_3Z_1^{L_x}Z_2^{L_x}R}{R^3}. \quad (5.13)$$

Choosing $Z_3 = R^3$ results in:

$$Z_3^{L_x} = (R^3)^{L_x} \text{ and } Z_3^{L_y} = (R^3)^{L_y}, \quad (5.14)$$

which allows us to write equation (5.13) as:

$$\frac{X_3}{Z_3^{L_x}} = \frac{X'_3Z_1^{L_x}Z_2^{L_x}RR^{3L_x-3}}{R^{3L_x}}. \quad (5.15)$$

From equation (5.15), we have $Z_3^{L_x} = R^{3L_x}$ and $X_3 = X'_3Z_1^{L_x}Z_2^{L_x}R^{3L_x-2}$. In the equation for $Y'_3$, i.e., equation (5.9), we can take $R^{3L_x-2}$ as a common factor from $Z_3^{L_x}$ and $X_3$ and rewrite equation (5.9) as:

$$Y'_3 = R^{3L_x}(UX_1 - Y_1VZ_2^{L_y-L_x}) - X'_3Z_1^{L_x}Z_2^{L_x}R^{3L_x-2}UZ_1^{L_x}$$

$$= R^{3L_x-2}(R^2(UX_1 - Y_1VZ_2^{L_y-L_x}) - X'_3Z_1^{L_x}Z_2^{L_x}UZ_1^{L_x}).$$

Letting $Y''_3 = R^2(UX_1 - Y_1VZ_2^{L_y-L_x}) - X'_3Z_1^{L_x}Z_2^{L_x}UZ_1^{L_x}$, then $Y'_3 = R^{3L_x-2}Y''_3$. Therefore, equation (5.12) can be written as:

$$\frac{Y_3}{Z_3^{L_y}} = \frac{R^{3L_x-2}Y''_3Z_2^{L_x}}{RR^{3L_x}} = \frac{R^{3L_x-3}Y''_3Z_2^{L_x}}{R^{3L_x}} = \frac{Y''_3Z_2^{L_x}}{R^3}. \quad (5.16)$$

Finally, equation (5.16) can be written as:

$$\frac{Y_3}{Z_3^{L_y}} = \frac{Y''_3Z_2^{L_x}(R^3)^{L_y-1}}{R^{3L_y}}. \quad (5.17)$$

From equations (5.15) and (5.17), we obtain the following set of addition formulae (5.18):

$$\left.\begin{array}{l} X_3 = X'_3Z_1^{L_x}Z_2^{L_x}R^{3L_x-2} \\ Y_3 = Y''_3Z_2^{L_x}(R^3)^{L_y-1} \\ Z_3 = R^3 \\ Z_3^{L_x} = R^{3L_x} \\ Z_3^{L_y} = R^{3L_y} \\ \text{where, } U = Y_2Z_1^{L_y} - Y_1Z_2^{L_y}, \ V = X_2Z_1^{L_x} - X_1Z_2^{L_x}, \\ S = X_2Z_1^{L_x} + X_1Z_2^{L_x}, \ R = (VZ_1^{L_y}Z_2^{L_y}) \\ X'_3 = U^2Z_1^{L_x}Z_2^{L_x} - SV^2(Z_1^{L_y-L_x}Z_2^{L_y-L_x})^2, \\ Y''_3 = R^2(UX_1 - Y_1VZ_2^{L_y-L_x}) - X'_3UZ_1^{L_x}Z_2^{L_x} \end{array}\right\}$$

Selection of $L_x$ and $L_y$ values plays a prominent role in optimizing the computation complexity of the addition formulae of (5.18). If $L_x$ and $L_y$ are selected in a way that causes the expression $(L_y - L_x)$ to be negative, then we need a field inversion operation to calculate the terms $Z_1^{L_y-L_x}$ and $Z_2^{L_y-L_x}$. In other words, existence of the terms $Z_1^{L_y-L_x}$ and $Z_2^{L_y-L_x}$ in the formulae of (5.18) may cause the need for inversion operations if we have a negative power; i.e., if $L_y - L_x < 0$. However, this problem can be solved by restricting the selection of $L_x$ and $L_y$ to the rule: $L_y - L_x \geq 0$. When $L_y = L_x$ then, $L_y - L_x = 0$ and we get the optimal PPC addition formulae of (5.18).

Optimized Doubling Formulae

Doubling formulae (4.27) are the most general formulae that can operate without any restriction in the values of the projecting parameters $L_x$ and $L_y$. However, their computation complexity can be reduced by reproducing these formulae with $Z_1$ as a common factor in each equation (whenever it is possible) and simplifying the resultant formulae through elimination of the unnecessary terms. This results in the existence of terms such as $Z_1^{L_y-L_x}$, in which the exponent is a relation between $L_x$ and $L_y$. Following a similar mathematical procedure to that shown above in the derivations of the respective parameterized projective coordinates, we obtain the following doubling formulae (5.27):

$$X_3 = X_3' S Z_1^{L_y}(S^3 Z_1^{L_y})^{L_x-1}$$
$$Y_3 = Y_3''(S^3 Z_1^{L_y})^{L_y-1}$$
$$Z_3 = S^3 Z_1^{L_x}$$
$$Z_3^{L_x} = (S^3 Z_1^{L_x})^{L_x}$$
$$Z_3^{L_y} = (S^3 Z_1^{L_x})^{L_y}$$
Where, $W = 3X_1^2 + aZ_1^{2L_x}$, $S = 2Z_1^{L_x} Y_1$
$$X_3' = (WZ_1^{L_y-L_x})^2 - 4SX_1 Y_1$$
$$Y_3'' = S^2(WX_1 Z_1^{2(L_y-L_x)} - SY_1) - X_3' W Z_1^{2(L_y-L_x)} Z_1^{L_x}$$

As with addition, selection of $L_x$ and $L_y$ values plays a prominent role in optimizing the computation complexity of the doubling formulae of (5.27). If $L_x$ and $L_y$ are selected in a way that causes the expression $(L_y-L_x)$ to be negative, then we need a field inversion operation to calculate the term $Z_1^{L_y-L_x}$. In other words, existence of the term $Z_1^{L_y-L_x}$ in the formulae of (5.27) may cause the need for an inversion operation if we have a negative power; i.e., if $L_y-L_x<0$. However, this problem can be solved by restricting the selection of $L_x$ and $L_y$ to the rule: $L_y-L_x \geq 0$. When $L_y=L_x$, then $L_y-L_x=0$, and we get the optimal PPC doubling formulae, as can be observed in (5.27).

In order to examine runtime randomization of parameterized projective coordinate systems, we note that elliptic curve scalar multiplication, KP, can be computed using any of Algorithms 1 through 5. As discussed above, using projective coordinates is strongly recommended to avoid the field inversion operations (or, equivalently, division) while computing KP.

Many countermeasures against differential power analysis attacks rely on randomized projective coordinates. However, all of these countermeasures depend upon a predetermined single or a small set of projective coordinate systems that are decided at the design stage. The method of the present invention uses runtime randomization of parameterized projective coordinates (RRPPC).

A common property of the RRPPC countermeasures is that the projective coordinate system is selected by the cryptodevice at random, i.e., it is not predetermined. Variations of the method of the present invention differ in the manner of selecting $L_x$ and $L_y$ values. Three countermeasure implementations based on the RRPPC are presented below. However, it should be noted that the proposed countermeasures can work with any scalar multiplication algorithm.

The first countermeasure is based on the unrestricted selection of $L_x$ and $L_y$ values. Therefore, $L_x$ and $L_y$ can be selected randomly in the range of integers from 1 to N. This countermeasure uses the PPC addition formulae of (4.18) and the PPC doubling formulae of (4.27). The steps of the first countermeasure are shown below in Algorithm 6.1 and can be summarized as follows:

Step 1: randomly select $L_x$ value in the range from 1 to N;
Step 2: randomly select $L_y$ value in the range from 1 to N;
Step 3: project the base point P to the point $\tilde{P}$ using the parameterized transformation functions of equation (4.2). The projected point $\tilde{P}$ is then used as input to the scalar multiplication algorithm. The output of the scalar multiplication algorithm is the point Q; and
Step 4: Since the scalar multiplication uses the PPC formulae for both addition and doubling operations, the resultant point, Q, will be generated in the PPC representation. Step 4 brings the point Q back to the affine coordinates representation by applying the reverse transformation functions (RRPPC$^{-1}$) of the transformation functions of equation (4.2).

Algorithm 6.1: Countermeasure 1

INPUT    K,P
OUTPUT   KP
1. $L_x$=Rand(1..N)
2. $L_y$=Rand(1..N)
3. $\tilde{P}$=RRPPC(P)
4. Any scalar multiplication algorithm
   For ADD Use Formulae 4.18
   For DBL Use Formulae 4.27
   Q←Output of the algorithm
5. R=RRPPC$^{-1}$(Q)
return (R)

The second countermeasure is based on the optimized PPC addition and doubling formulae of equations (5.18) and (5.27) in which $L_x$ and $L_y$ are selected according to the rule: $L_y-L_x \geq 0$. This countermeasure uses the optimized PPC addition formulae of (5.18) and the optimized PPC doubling formulae of (5.27). The steps of the second countermeasure are shown in Algorithm 6.2 below and can be summarized as follows:

Step 1: randomly select $L_x$ value in the range from 1 to N;
Step 2: randomly select $L_y$ value in the range from 1 to N such that $L_y-L_x \geq 0$;
Step 3: project the base point P to the point $\tilde{P}$ using the parameterized transformation functions of equation (4.2). The projected point $\tilde{P}$ is then used as input to the scalar multiplication algorithm. The output of the scalar multiplication algorithm is the point Q;
Step 4: since the scalar multiplication uses the optimized PPC formulae for both addition and doubling operations, the resultant point, Q, will be generated in the PPC representation. Step 4 brings the point Q back to the affine coordinates representation by applying the reverse transformation functions (RRPPC$^{-1}$) of the transformation functions of equation (4.2).

Algorithm 6.2: Countermeasure 2

INPUT    K,P
OUTPUT   KP
1. $L_x$=Rand(1..N)
2. $L_y$=Rand(1..N) such that $L_y - L_x \geq 0$
3. $\tilde{P}$=RRPPC(P)
4. Any scalar multiplication algorithm
   For ADD Use Formulae 5.18
   For DBL Use Formulae 5.27
   Q←Output of the algorithm
5. R=RRPPC$^{-1}$(Q)
return (R)

The third countermeasure is based on the optimized PPC addition and doubling formulae of equations (5.18) and (5.27) in conjunction with selecting $L_x$ and $L_y$ according to the rule: $L_y=L_x$. This countermeasure uses the optimized PPC addition formulae of (5.18) and the optimized PPC doubling formulae of (5.27). The steps of the third countermeasure are shown in Algorithm 6.3 and can be summarized as follows:

Step 1: randomly select $L_x$ value in the range from 1 to N;
Step 2: set $L_x=L_x$;
Step 3: project the base point P to the point $\tilde{P}$ using the parameterized transformation functions of equation (4.2). The projected point $\tilde{P}$ is then used as input to the scalar multiplication algorithm. The output of the scalar multiplication algorithm is the point Q; and,
Step 4: since the scalar multiplication uses the optimized PPC formulae for both addition and doubling operations, the resultant point, Q, will be generated in the PPC representation. Step 4 brings the point Q back to the affine coordinates representation by applying the reverse transformation functions (RRPPC$^{-1}$) of the transformation functions of equation (4.2).

---

Algorithm 6.3: Countermeasure 3

---

INPUT     K,P
OUTPUT    KP
1. $L_x$=Rand(1..N)
2. Set $L_y=L_x$
3. $\tilde{P}$ =RRPPC(P)
4. Any scalar multiplication algorithm
    For ADD Use Formulae 5.18
    For DBL Use Formulae 5.27
    Q←Output of the algorithm
5. R=RRPPC$^{-1}$(Q)
return (R)

---

In conclusion, the method for elliptic curve scalar multiplication using parameterized projective coordinates increases the efficiency of elliptic curve cryptosystems used for communications over an insecure communications channel. The insecure communications channel may be, e.g., a telephone network, such as a cellular telephone network; the Internet, where cryptographic systems may be employed for security in e-commerce payment transactions conducted through a web browser via Hypertext Transfer Protocol (HTTP), or for the security of electronic mail messages conducted via Simple Mail Transfer Protocol (SMTP) and POP3 protocols, or for confidential file transfers via File Transfer Protocol (FTP); or for smart card transactions between a smart card (a plastic card having an embedded microprocessor and limited memory) and a server via a smart card reader and transmission line for credit card or bank transactions, identification cards, access cards, and the like.

Further, the method may be employed for key exchange in a public-key cryptosystem, for digital signatures, and for the encryption of plaintext messages or data, all of which require scalar multiplication of the form kP, wherein k is a scalar and P is a point on an elliptic curve. The method of the present invention may be particularly useful in connection with smart cards, wherein the small key size and limited data transfer (identification data, account numbers, etc.) make elliptic curve cryptographic methods particularly advantageous, although the quicker execution time and lower memory storage requirements of the method enhance data encryption over any insecure communications channel.

The present invention would also extend to any cryptographic device programmed to, or having dedicated circuits configured to, execute the steps of the method, including a computer, a microprocessor or microcontroller, a digital signal processor, an Application Specific Integrated Circuit (ASIC), and may be implemented in a computer, telephone, radio transceiver, smart card, or any other communications device. Further, the present invention extends to any computer readable media having instructions stored thereon that, when loaded into main memory and executed by a processor, carries out the steps of the method, including: integrated circuit memory chips; hard disk drives; floppy disk drives; magnetic or optical memory media, including compact disks (CD) and digital versatile disks (DVD); and any other media capable of storing instructions executable by a processor when loaded into main memory.

It should be understood that the calculations may be performed by any suitable computer system, such as that diagrammatically shown in the sole drawing FIGURE. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A method for elliptic curve scalar multiplication in an elliptic curve cryptosystem implemented over an insecure communications channel, comprising the steps of:
   (a) selecting positive integers $L_x$ and $L_y$, wherein $L_x$ and $L_y$ are not both equal to 1, and wherein $L_y \neq 3$ if $L_x=2$;
   (b) storing the positive integers $L_x$ and $L_y$ in computer readable memory;
   (c) selecting a projective coordinate system;
   (d) representing coordinates of a point P=(x,y) on an elliptic curve of the form F(x,y)=$y^2-x^3-ax-b=0$ defined over a finite field as projective coordinates according to transforms $$x = \frac{X}{Z^{L_x}} \text{ and } y = \frac{Y}{Z^{L_y}},$$

respectively, wherein X, Y and Z are orthogonal projective coordinates in the selected projective coordinate system, and wherein the orthogonal projective coordinates are defined by expressing the elliptic curve in the orthogonal projective coordinates as $Y^2Z^{3L_x-2_x}=X^3+aXZ^{2L_x}+bZ^{3L_x}$;

(e) adding together K copies, K being a scalar, of the point $P(X,Y^{L_x},Z^{L_y})$ to obtain the scalar multiplication product KP;

(f) storing the scalar multiplication product KP in the computer readable memory;

(g) converting the scalar multiplication product from parameterized projective coordinates $P(X, Y, Z^{L_x}, Z^{L_y})$ to affine coordinates $P(x,y)$;

(h) maintaining the scalar K as private and making the point $P(x,y)$ and the scalar multiplication product KP public for establishing elliptic curve public-key agreement;

(i) embedding a plaintext message onto a point on the elliptic curve to form a message point; and (j) adding the message point to the scalar multiplication product KP in order to encrypt the plaintext message, the encrypted plaintext message being stored in the computer readable memory.

2. The method for elliptic curve scalar multiplication as recited in claim 1, wherein step (e) comprises performing a plurality of point addition and point doubling operations in an order corresponding to a binary representation of the scalar K.

3. The method for elliptic curve scalar multiplication as recited in claim 2, wherein the order corresponds to the most significant digit to the least significant digit in the binary representation of the scalar K.

4. The method for elliptic curve scalar multiplication as recited in claim 2, wherein step (e) further comprises at least one dummy addition when a corresponding digit of the scalar K is equal to zero in order to defeat a differential power analysis attack.

5. The method for elliptic curve scalar multiplication as recited in claim 2, wherein the order corresponds to the least significant digit to the most significant digit in the binary representation of the scalar K.

6. The method for elliptic curve scalar multiplication as recited in claim 1, wherein step (a) comprises automatically generating $L_x$ and $L_y$ from a random number generator.

7. The method for elliptic curve scalar multiplication as recited in claim 1, wherein $0<L_x\leq N$ and $0<L_y\leq N$, where N is the number of bits in a binary representation of the coordinates x and y of point P.

8. The method for elliptic curve scalar multiplication as recited in claim 1, wherein step (a) further comprises the steps of:

selecting $L_x$ before $L_y$; and further restricting $L_y$ so that $L_y-L_x\geq 0$, whereby point addition and point doubling operations required by step (e) are optimized.

9. The method for elliptic curve scalar multiplication as recited in claim 1, wherein step (a) further comprises the steps of:

selecting $L_x$ before $L_y$; and further restricting $L_y$ so that $L_y=L_x$, whereby point addition and point doubling operations required by step (e) are optimized.

10. A computer software product that includes a non-transitory storage medium readable by a processor, the non-transitory storage medium having stored thereon a set of instructions for performing elliptic curve scalar multiplication in an elliptic curve cryptosystem implemented over an insecure communications channel, the instructions comprising:

(a) a first set of instructions which, when loaded into main memory and executed by the processor, causes the processor to select positive integers $L_x$ and $L_y$, wherein $L_x$ and $L_y$ are not both equal to 1, and $L_y\neq 3$ if $L_x=2$;

(b) a second set of instructions which, when loaded into main memory and executed by the processor, causes the processor to store the positive integers $L_x$ and $L_y$ in computer readable memory;

(c) a third set of instructions which, when loaded into main memory and executed by the processer, causes the processor to select a projective coordinate system;

(d) a fourth set of instructions which, when loaded into main memory and executed by the processor, causes the processor to represent coordinates of a point $P=(x,y)$ on an elliptic curve of the form $F(x,y)=y^2-x^3-ax-b=0$ defined over a finite field as projective coordinates according to transforms $$x = \frac{X}{Z^{L_x}} \text{ and } y = \frac{Y}{Z^{L_y}},$$

respectively, wherein X, Y and Z are orthogonal projective coordinates in the selected projective coordinate system, and wherein the orthogonal projective coordinates are defined by expressing the elliptic curve in the orthogonal projective coordinates as $$Y^2Z^{3L_x-2L_x}=X^3+aXZ^{2L_x}+bZ^{3L_x};$$

(e) a fifth set of instructions which, when loaded into main memory and executed by the processor, causes the processor to add together K copies, K being a scalar, of the point $P(X,Y,Z^{L_x},Z^{L_y})$ to obtain the scalar multiplication product KP;

(f) a sixth set of instructions which, when loaded into main memory and executed by the processor, causes the processor to store the scalar multiplication product KP in the computer readable memory;

(g) a seventh set of instructions which, when loaded into main memory and executed by the processor, causes the processor to convert the scalar multiplication product from parameterized projective coordinates $P(X,Y,Z^{L_x}, Z^{L_y})$ to affine coordinates $P(x,y)$;

(h) an eighth set of instructions which, when loaded into main memory and executed by the processor, causes the processor to maintain the scalar K as private and making the point $P(x,y)$ and the scalar multiplication product KP public for establishing elliptic curve public-key agreement;

(i) a ninth set of instructions which, when loaded into main memory and executed by the processor, causes the processor to embed a plaintext message onto a point on the elliptic curve to form a message point; and (j) a tenth set of instructions which, when loaded into main memory and executed by the processor, causes the processor to add the message point to the scalar multiplication product KP in order to encrypt the plaintext message, the encrypted plaintext message being stored in the computer readable memory.

11. The computer software product as recited in claim 10, further comprising a tenth set of instructions which, when loaded into main memory and executed by the processor, causes the processor to transmit the encrypted plaintext message.

* * * * *